United States Patent [19]

Feigel

[11] Patent Number: 5,386,893
[45] Date of Patent: Feb. 7, 1995

[54] CONTROLLABLE HYDRAULIC VIBRATION ABSORBER

[75] Inventor: Hans-Joerg Feigel, Rosbach, Germany

[73] Assignee: Alfred Teves GmbH, Germany

[21] Appl. No.: 952,018

[22] Filed: Sep. 28, 1992

[30] Foreign Application Priority Data

Sep. 27, 1991 [DE] Germany .............. 4132262

[51] Int. Cl.6 ................ B60G 17/08; F16F 9/46; G01H 17/00
[52] U.S. Cl. .............. 188/299; 188/322.14; 188/318; 188/315
[58] Field of Search ............. 188/299, 322.13, 322.14, 188/281, 282, 311, 313, 314, 315, 316–319, 322.19, 280; 280/707, 714; 73/649, 658, 671

[56] References Cited

U.S. PATENT DOCUMENTS

| 3,125,186 | 3/1964 | Day | 188/299 |
|---|---|---|---|
| 4,031,989 | 6/1977 | Blazquez | 188/299 |
| 4,561,524 | 12/1985 | Mizumukai et al. | 188/322.14 |
| 4,638,896 | 1/1987 | Poyser | 188/299 |
| 4,650,042 | 3/1987 | Knecht et al. | 188/299 |
| 4,917,222 | 4/1990 | Bacardit | 188/299 |
| 4,921,080 | 5/1990 | Lin | 188/311 |
| 4,960,188 | 10/1990 | Wossner | 188/299 |
| 4,973,854 | 11/1990 | Hummel | 188/299 |
| 5,251,730 | 10/1993 | Ackermann et al. | 188/318 |

FOREIGN PATENT DOCUMENTS

| 574433 | 4/1959 | Canada | 188/318 |
|---|---|---|---|
| 0486441 | 5/1992 | European Pat. Off. | 188/318 |
| 3303293 | 1/1984 | Germany . | |
| 3807913 | 7/1989 | Germany | 188/299 |
| 3924168 | 1/1991 | Germany | 188/299 |
| 4108026 | 9/1992 | Germany . | |
| 4108027 | 9/1992 | Germany . | |
| 4137403 | 5/1993 | Germany . | |
| 0037439 | 2/1991 | Japan | 188/322.14 |
| 4-34237 | 2/1992 | Japan | 188/315 |
| 2222864 | 3/1990 | United Kingdom | 188/299 |
| 2223822 | 4/1990 | United Kingdom | 188/299 |
| 2234041 | 1/1991 | United Kingdom | 188/318 |
| 9110077 | 7/1991 | WIPO | 188/299 |
| 9216771 | 10/1992 | WIPO | 188/299 |
| 9216772 | 10/1992 | WIPO | 188/299 |

Primary Examiner—Douglas C. Butler
Attorney, Agent, or Firm—Robert P. Seitter; J. Gordon Lewis

[57] ABSTRACT

A controllable hydraulic vibration absorber is disclosed whose power cylinder and a tube defines a connecting duct which affords a balance of volume between both power chambers of the vibration absorber and a balancing chamber which is formed between the tube and an external tube disposed coaxially with it. The controllable vibration absorber valve affords variations of the vibration absorbing power and allows a flow through it in one direction only and is arranged between the connecting duct and the balancing chamber so as to be integrated as to its action in a valve assembly which is constituted by a non-return valve and by a switching valve. The switching valve is inserted between the second power chamber and the connecting duct.

15 Claims, 5 Drawing Sheets

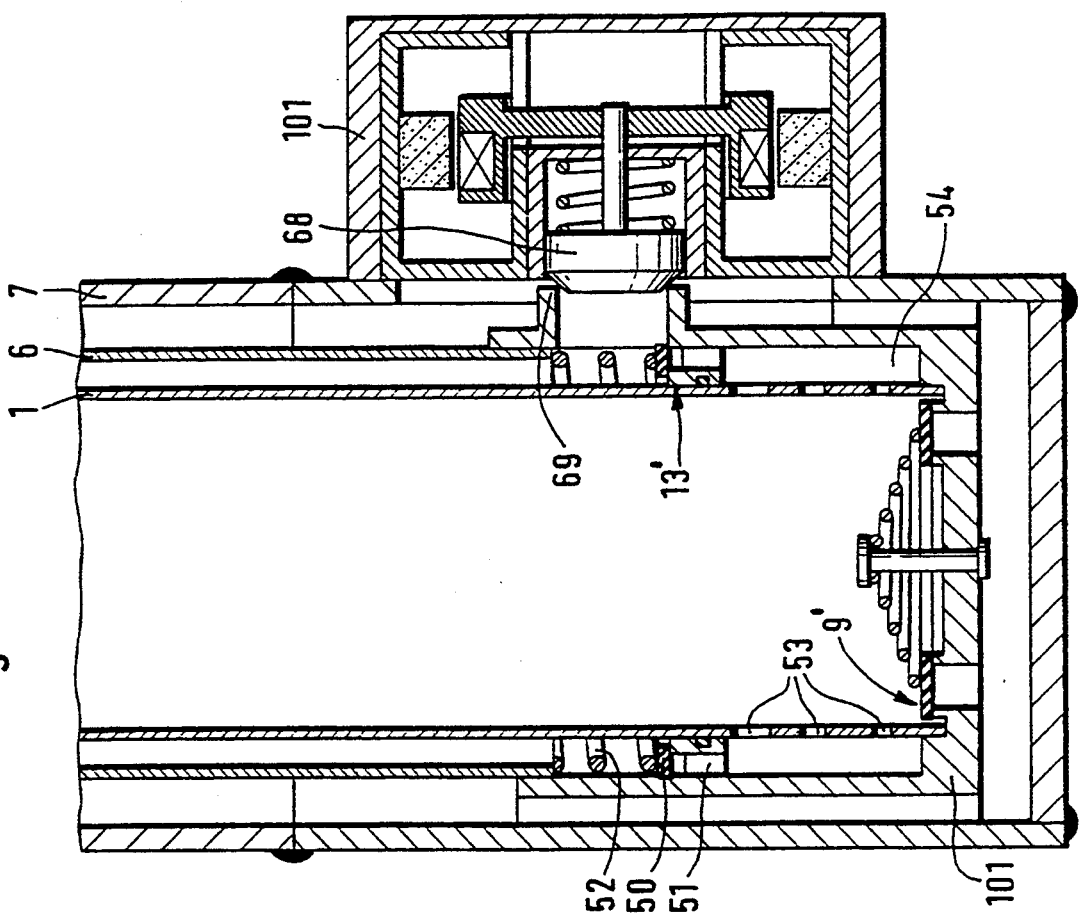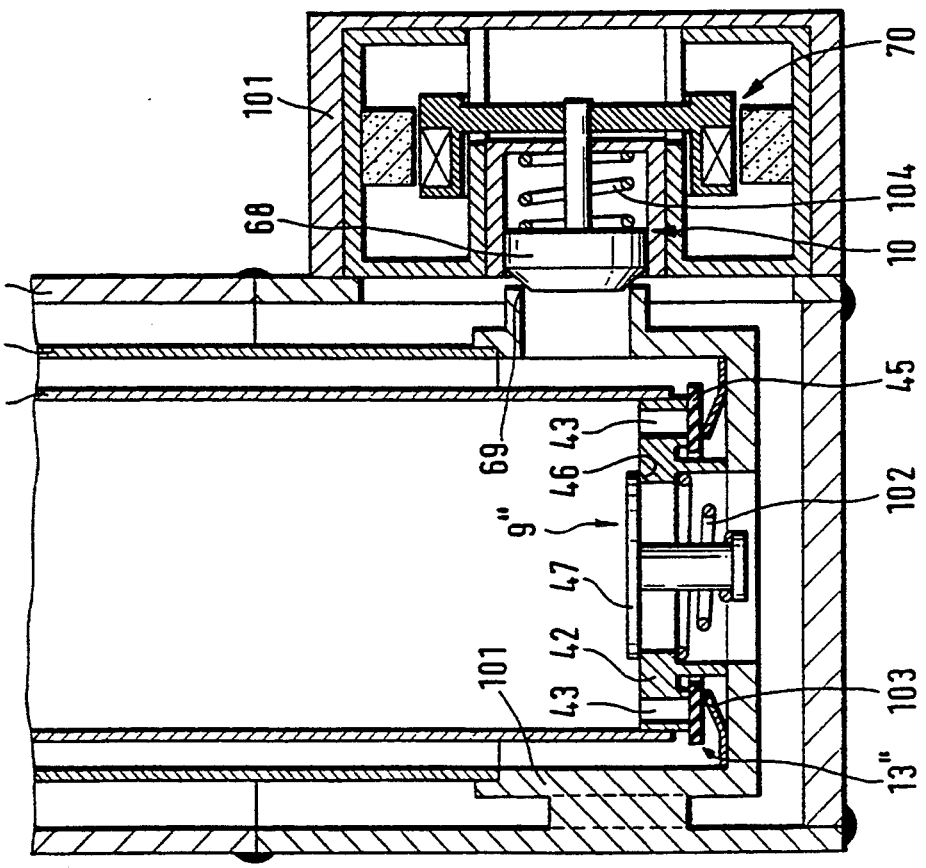

CONTROLLABLE HYDRAULIC VIBRATION ABSORBER

BACKGROUND OF THE INVENTION

The invention is related to a controllable hydraulic vibration absorber for automotive vehicles. It includes a power cylinder whose interior space is subdivided by means of a piston being slidable by a piston rod into a first (piston rod-side) and a second (piston-side) power chamber. A tube is positioned coaxially with said power cylinder, and jointly with the power cylinder defines a connecting duct. An external tube is positioned coaxially with said power cylinder, respectively with said tube, and which jointly with said tube defines a balancing chamber which is partly filled with oil and which is in connection with said first power chamber through said connecting duct and in connection with said second power chamber through a non-return valve. A switching valve is subjected to the pressure existing within the second chamber. A controllable vibration absorber valve which affords variations of the vibration absorbing power, the non-return valve and the switching valve form a valve assembly.

A vibration absorber of this kind is known, for example, from the German patent specification, No. 3,303,293. The two power chambers of the prior-art vibration absorber can be connected to the balancing chamber separately from each other only through a bottom valve which is pressure-dependently controllable so that in the thrust stage it connects the balancing chamber and the first power chamber and in the traction stage exclusively the second power chamber. In this way, in both stages the total displaced vibration absorbing liquid must flow through the vibration absorber piston with a vibration absorbing power adjusting apparatus. In order to actuate the vibration absorbing power adjusting apparatus which is formed by a variable opening, a rotating solenoid is provided at the upper end of the piston rod. A control rod is positioned within the piston rod and includes a disc that can be rotated. In this configuration, the disc interacts with the variable opening whose active diameter is being varied.

The state-of-the-art vibration absorber is less advantageous than the present invention because it requires sophisticated set-up of the vibration absorber piston which has two preadjusted vibration absorber valves and whose manufacture involves considerable costs. Also both the complicated, pressure-controlled switching valve which is positioned at the bottom of the power cylinder and the method of adjustment of the vibration absorbing power is also a disadvantage. The adjustment takes place within the vibration absorber piston and is attained by an interaction of a plurality of electrical and mechanical components.

It is, therefore, the object of the present invention to provide a hydraulic vibration absorber with adjustable vibration absorption of the kind mentioned above which is distinguished by a simpler structure and, thus, low manufacturing cost. In particular the variation of the vibration absorbing power is rendered possible within a wide range with simple-design and reliably functioning components.

According to the invention this object is achieved in that the controllable vibration absorber valve is configured such as to allow a flow through it in one direction only and such as to be integrated as to its action between the connecting duct and the balancing chamber in the valve assembly. The switching valve is inserted between the second power chamber and the connecting duct. Due to this inventive provision, a major simplification of the manufacture is attained making use of a modular concept. A valve assembly so constructed can be manufactured and tested completely separately. The simple design of the vibration absorber piston affords a smooth incorporation of a travel measuring system which is of importance for the regular functioning of the vibration absorber. In addition, the vibration absorber valve which features a unidirectional flow through it will allow it to be optimized with regard to the compensation of the fluid dynamic forces.

According to one embodiment of the invention, the valve assembly is accommodated within a valve housing which is located in the bottom range of the power cylinder. The non-return valve, the switching valve, and the controllable vibration absorber valve are configured so as to be coaxial with respect to one another. Due to the compact design of the vibration absorber, space availability is not a problem.

An extension of the vibration absorber stroke is achieved in a further preferred embodiment of the invention in that the valve assembly is positioned in a valve housing which is provided in the bottom range of the power cylinder and is preferably welded to the external tube. The non-return valve and the switching valve are positioned coaxially with each other and the controllable vibration absorber valve is positioned at a right angle to the axis of the non-return valve, respectively of the switching valve. As a result of this, the influence that the longitudinal acceleration of the vibration absorber has on the closing element of the vibration absorber valve will be greatly reduced.

A particularly simple structure of the inventive vibration absorber is achieved in another advantageous embodiment of the invention in that the non-return valve and the switching valve are configured coaxially with each other at the bottom of the power cylinder. The switching valve is provided between the second power chamber and the connecting duct. The controllable vibration absorber valve allowing a flow through it in one direction only and being inserted as to its action between the connecting duct and the balancing chamber is housed within a vibration absorber valve housing which is separated from the valve housing, at a right angle to the axis of the non-return valve, respectively of the switching valve.

In a further embodiment of the inventive subject matter the controllable vibration absorber valve is constructed so as to be connected to the valve assembly as a separate component. This solution is especially expedient in chassis systems with a level control device, since otherwise the balancing chamber requires too much space at the vibration absorber. In addition, an upside-down incorporation is also possible.

According to another advantageous embodiment of the invention the switching valve, respectively the second non-return valve, is formed by a valve disc which interacts with passages formed in a valve body and which is elastically prestressed. The first non-return valve is designed in the shape of a closing element which interacts with a sealing seat formed in the valve body and which is elastically prestressed. The aim achieved in this manner is that no crossing of the hydraulic pressure agent paths will come about in operation, so that the behavior of the valve assembly can be regarded as non-critical as far as flow resistances are concerned.

A further advantage is achieved in a further embodiment in that the switching valve, respectively the second non-return valve, is formed by a valve disc which is arranged coaxially with the power cylinder. The switching valve interacts with passages formed in the valve housing, is elastically prestressed, and is positioned radially outside the power cylinder. These provisions afford a facilitated routing of lines leading to the travel measuring system and create favorable conditions for the realization of a travel-dependent vibration absorbing function in the bottom range of the hydraulic cylinder.

In an embodiment the invention the above-mentioned travel-dependent vibration absorption both in the traction and in the thrust stage is achieved in that the power cylinder is furnished with openings which can completely or partly be passed over by the piston in its final strokes. The openings are formed in an annular chamber which is defined by the second non-return valve and by the valve housing. This is of particular importance in modern chassis control systems with a semiactive control. A very "smooth" adjustment is customary which results in wide vibration absorber strokes at high speed so that an efficient vibration absorption in the final positions contributes to the protection of the components.

A further increase of the stroke is achieved according to another advantageous feature of the invention in that the non-return valve and the switching valve are formed by valve discs which are positioned outside the power cylinder within a valve housing at a distance from each other coaxially with the power cylinder. They are elastically prestressed and interact with passages formed in a valve body. The controllable vibration absorber valve is positioned within an absorber valve housing which is furnished with hydraulic pressure fluid ducts and is laterally flangeable to the valve housing. The power cylinder is provided with openings in the final stroke positions of the piston which are in active connection with the passages. Possibilities of free access through the bottom of the power cylinder are created by these measures which can, for instance, be made use of in the event of the incorporation of sensors etc. In addition, an easy exchangeability of the vibration absorber valve is safeguarded which will be expedient, in particular, for test purposes and in case of a damage.

In this configuration each one of the valve discs is prestressed by one spiral spring which takes support at the valve housing, respectively at the tube. It is the essential advantage of the spiral springs with low and slight pressure increases in the presence of large flow rates are realized. Furthermore, the arrangement allows for the use of large spiral springs without restriction of the piston stroke.

According to the invention the vibration absorber valve may be designed in the shape of a seat valve or a slide valve whose closing element is actuatable either directly or as a main stage indirectly through a pilot control stage by an electromechanic transducer.

It another advantageous design version the valve housing is designed in two-parts and includes the first valve body and a vibration absorber valve part in whose central range slots are formed, respectively with bores and a central bore. A guided slide serves as a closing element of the vibration absorber valve and is preferably designed so as to be pressure-balanced and is coupled to a second, pressure-unbalanced slide which is guided on the vibration absorber valve part and which interacts with slots, respectively with bores being configurated in the latter.

Especially in the range of small volumetric flow rates these measures bring about an improvement of the functioning, respectively of the behavior of the inventive vibration absorber with regard to desired spring comfort, as beyond an adjustable pressure limiting function the restricting effect, too, allows adjustment by the described valve.

Another advantageous design variant of the invention is that the valve housing is designed in two-parts and is composed of the first valve body and a guide element. The main stage is formed by a main slide which interacts with a control edge formed in the guide element and the pilot control stage is formed by a control slide which interacts with control bores formed in the main slide. A two-stage vibration absorber valve having a set-up of this kind requires less positioning power and affords a better handling of more elevated vibration absorbing forces.

In this context, the control edge is positioned adjacent flow-off bores which are formed in the guide element and are in connection with the balancing chamber and through whose size and geometric shape the performance characteristics of the main stage are influenced. It will be expedient in this conjunction when the main slide is open in its upper part and is furnished with bores which allow it to be brought in connection with said flow-off bores.

According to a further preferred embodiment of the invention the main slide is prestressed by means of a first compression spring in the closing direction of the main stage and is abutted against the first valve body. It is safeguarded in this manner that the main stage is being closed automatically at the standstill of the piston.

Any suction problems, respectively displacement problems at the main slide occurring during operation of the inventive vibration absorber are preferably eliminated when the abutment of the main slide against the first valve body takes place by means of axial projections.

In another advantageous embodiment of the invention, the main slide is provided with restricting bores which end up, on one side, in the range of the bores and, on the other side, in a hydraulic chamber which is defined by the main slide in the guide element. By this provision both a smooth oil supply of the pilot control stage and functionally important pressure drops during the flow through the restricting bores are achieved.

An advantageous coupling of the main stage to the pilot control stage is achieved in another embodiment of the subject matter of the invention in that the control slide is guided in the main slide and may be in abutment against the latter under the prestressing action of a second compression spring.

An especially advantageous embodiment of the invention, whose pilot control stage is electromagnetically actuatable by a plunger coil interacting with a permanent magnet, consists in that the control slide is connected to the plunger coil support by means of a connecting element whose head can be in abutment against the main slide. In this way, an exact control of the vibration absorbing power in the lower range of piston speed and an adjustability of the vibration absorber valve and, thus, variations of the vibration absorbing power are rendered possible. Simultaneously a swinging of the control slide over the control bores is prevented. Of particular advantage, in this context, is the favorable dynamic behavior of the plunger coil.

According to another preferred design variant the electromechanic transducer essentially includes a plunger coil and permanent magnet mounted in a hydraulic chamber which is in connection with the balancing chamber. The end of the connecting element is fixed to the plunger coil support and is subjected to the effect of the pressure existing in the balancing chamber. In this way, the plunger coil is subject only to the pressure in the balancing chamber, whereby simultaneously the effect of a downwardly directed force on the captivating element is attained.

The tube is axially slidingly and/or rotatably positioned on the power cylinder in order to afford ease of assembly, respectively of adjustment of a laterally disposed vibration absorber valve.

In other disclosed versions of the invention, the moving direction of the vibration absorber piston is recognized and a monitoring of the relative speed of movement between the power cylinder and the vibration absorber piston is possible. In this version a flow switch is inserted between the second power chamber and the balancing chamber or a travel sensor is provided which senses the piston stroke.

The travel sensor may, for example, include a pipe, preferably an aluminum pipe, projecting into the piston rod and sealedly guided within the piston, and, by a core movably positioned within the pipe. The pipe partly projects out of the piston rod in the piston range. The pipe is fixed, at its end jutting out, in the range of the valve assembly, while the core is fixed to the piston rod.

According to another design of the travel sensor the pipe is positioned within the piston rod, while the core is sealedly guided within the pipe and is fixed to the bottom of the valve housing.

An improvement, respectively an increase of the responsiveness of the inventive vibration absorber is achieved in a variant in which the travel sensor is integrated in the hollow piston rod. The piston rod is furnished with means which afford a ventilation of its interior space. For this purpose, the sensor core defines, for example, a chamber within the pipe, which is in connection through a third non-return valve with vent ducts in the first power chamber. Furthermore, it will be of advantage when the third non-return valve is preceded by a filter. Along these lines, it will be particularly expedient when the third non-return valve and the filter are accommodated within a threaded plug which caps the piston rod.

According to an advantageous further development of the inventive subject matter the core is tubular in its upper range and jointly with the pipe defines an annular chamber which is in connection with the second power chamber. The annular chamber can be brought into connection with said power chamber through a fourth non-return valve which is formed by a valve slide guided in an elastically prestressed way on the core and interacting with openings which are formed in the core.

A unidirectional volumetric flow through a hydraulic pressure fluid connection within the piston rod is achieved by these provisions. Of course, the fourth non-return valve becomes effective exclusively in the thrust stage, while in the traction stage a return movement of the air which is not dissolved in the hydraulic oil cannot take place on account of the closed non-return valve. The chamber which is defined within the aluminum pipe can, optionally, be brought into connection with the annular chamber through a pressure limiting valve which is preferably constituted by a valve piston which is sealedly guided within the core, which is elastically prestressed and which interacts with openings (bores) formed in the core.

In order, finally, to minimize the pressure drops which occur in the valve assembly, according to another embodiment of the inventive vibration absorber the piston is furnished with a fifth non-return valve which affords a connection between the two power chambers in the event of a pressure increase in the second power chamber.

Further details, features and advantages of the invention will be revealed by the undermentioned description of a total of seven embodiments, making reference to the accompanying drawing.

BRIEF DESCRIPTION OF THE DRAWINGS

FIG. 4 shows a third embodiment of the valve assembly.

FIG. 5 shows a fourth embodiment of the valve assembly.

DETAILED DESCRIPTION OF THE DRAWINGS

Figure 1:
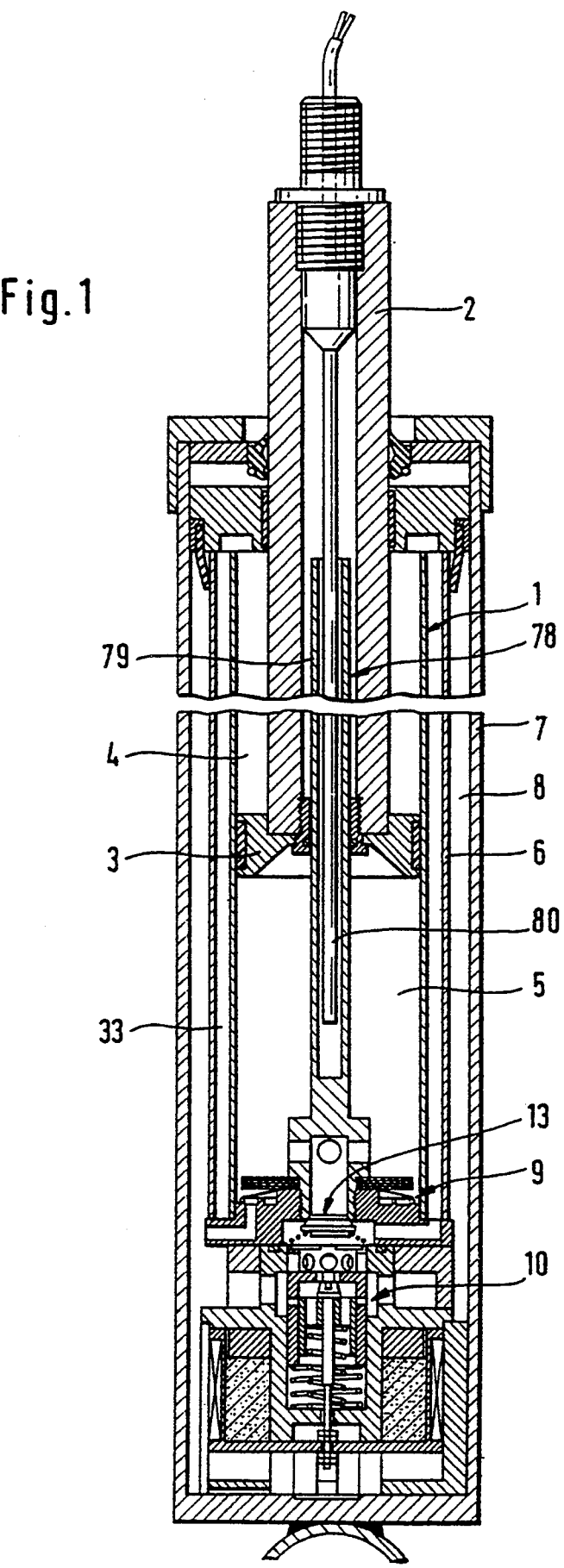
FIG. 1 shows an inventive controllable vibration absorber in a diagrammatic cross-sectional representation.

The controllable vibration absorber which is illustrated diagrammatically in FIG. 1 is comprised of a power cylinder 1 and of a tube 6 being disposed coaxially with said power cylinder 1, so that between these components a connecting duct 33 is formed. Coaxially with the power cylinder 1, respectively with the tube 6 an external tube 7 is arranged which jointly with said tube 6 defines a balancing chamber 8 being partly filled with oil, interacting with the connecting duct 33, and having a circular ring-shaped cross section. The interior space of the power cylinder 1 is subdivided by means of a piston 3 being slidable by a hollow piston rod 2 into a first power chamber 4 which is above the piston 3 and a second power chamber 5 which is beneath the piston 3.

In the bottom range of the illustrated vibration absorber there is a valve assembly, not labeled which is substantially composed of a non-return valve 9 being effective in the traction stage, of a switching valve 13 being effective in the thrust stage, as well as of a controllable vibration absorber valve which as a whole is given reference numeral 10. In this configuration the piston rod 2 accommodates a second pipe 79 which is, for example, made of aluminum and whose end projecting out of the piston rod 2 is fixed in the bottom range. Jointly with a core 80 being movably disposed therein and fixed to the piston rod the aluminum pipe 79 forms a travel sensor 78 which during operation of the inventive vibration absorber senses the stroke of the piston 3 and, thus, monitors its moving direction, respectively its moving speed.

Figure 2:
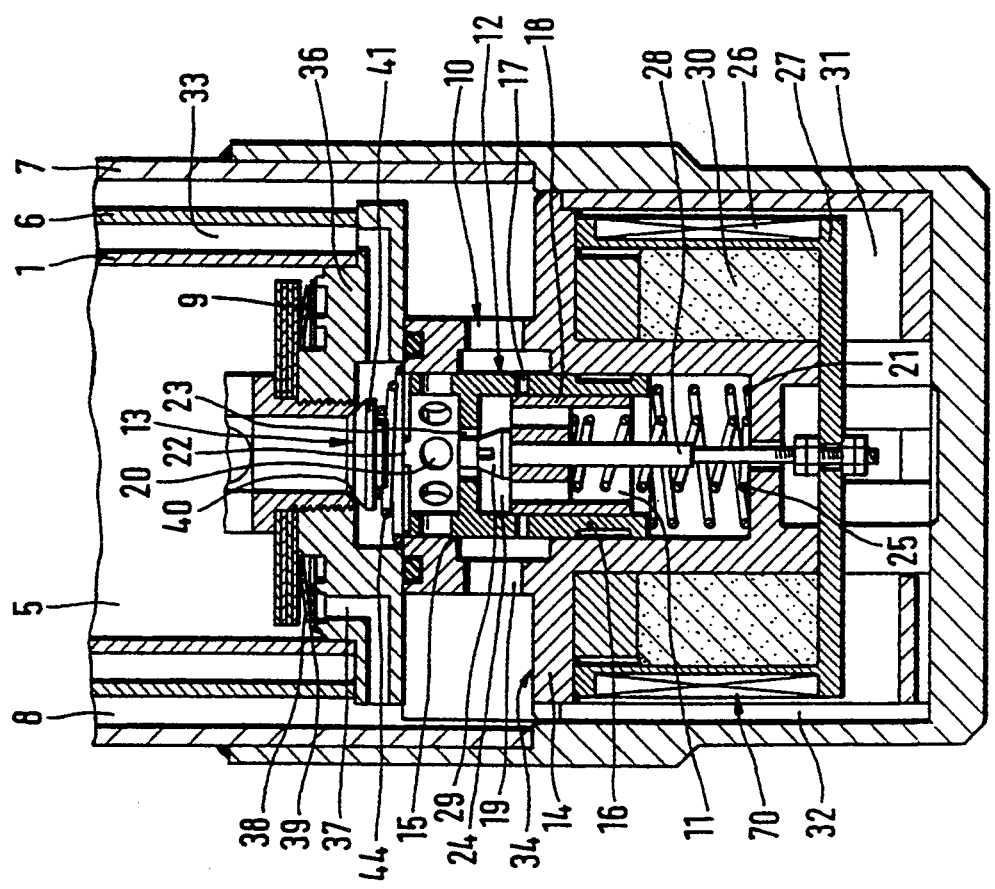
FIG. 2 shows the bottom range of the vibration absorber in FIG. 1 with the valve assembly in an upscaled representation.

As will be appreciated, in particular, from FIG. 2, both the non-return valve 9 and the switching valve 13 are formed in a valve body 36 which forms a part of a valve housing 34 accommodating the valve assembly. The non-return valve 9 includes in this instance a valve disc 39 which is prestressed by a spring 38 and which interacts with passages 37 being provided in the valve body 36 and renders possible an intake of oil from the balancing chamber 8 into the second power chamber 5 in the traction stage. The switching valve 13 which is subjectable to the pressure existing in the second power chamber 5 is composed of a disc-shaped closing element 41 which is prestressed by a second spring 44 and which interacts with a sealing seat 40 formed in the valve body 36, so that a second non-return valve is formed which is inserted as to its action between the second power chamber 5 and the connecting duct 33.

The vibration absorber valve 10, which is positioned beneath the valve body 36 and is preferably designed as a two-stage slide valve allowing a unidirectional flow through it, serves for the variation of the cross-sectional area of passage of the connection between the connecting duct 33 and the balancing chamber 8. The vibration absorber valve 10 can be installed as a module in the valve housing 55. It consists of a guide element 14 which is abutted against the valve body 36 and which accommodates both a pilot control stage 11 being preferably actuatable by an electromechanic transducer 70 and a main stage 12. In this context, the main stage 12 includes a main slide 16 which is slidingly guided in the guide element 14 and which interacts with a control edge 15 formed in the guide element 14. The control edge 15 is positioned in this configuration in the range of flow-off bores 19 which are in connection with the balancing chamber 8. The main slide 16 is open at its upper part and is furnished with a plurality of radial bores 20 which are uniformly distributed over its circumference and which are brought in connection with the flow-off bores 19 in the event of the main stage 12 being opened. In its position of rest, the main slide 16 is in abutment against the valve body 36 by means of axial projections 22 under the action of a first compression spring 21 and defines within the guide element 14 a hydraulic chamber 24 which is connected through restricting bores 23 to the range being furnished with the bores 20. The hydraulic chamber 24 is partially defined by a control slide 18 which is axially slidingly guided in the main slide 16. Slide 18 interacts with control bores 17 formed in the main slide 16 in the range of the flow-off bores 19 and extending radially. Slide 18 abuts against main slide 16 under the prestressing action of a second compression spring 25 positioned coaxially with the first compression spring 21.

The electromechanic transducer 70 which actuates the control slide 18 includes a plunger coil 26 and a permanent magnet 30. In this configuration, a connecting element 28 is fixed to the plunger coil support 27. Control slide 18 is connected to the plunger coil 26 by element 28 and is furnished with a head 29 in abutment against the main slide 16 from below in the condition of rest. Beneath the electromechanic transducer 70 there is a hydraulic chamber 31 which is filled with oil and which is in connection with the balancing chamber 8 through laterally axially extending ducts 32.

The plunger coil 26 of the electromechanic transducer 70 is energized with electric current in order to safeguard a smooth functioning of the inventive vibration absorber. The electromagnetic positioning power brings about a movement in the downward direction of the control slide 18, so that a connection between the balancing chamber 8 and the connecting duct 33 will be established. Now, when the piston 3 moves upward in the so-called traction stage, the pressure existing in the first power chamber 4 will become higher than the pressure in the second power chamber 5, positioned below the piston 3, while the switching valve, respectively the second non-return valve 13 will remain closed. As a consequence, the oil will be displaced out of the first power chamber 4 through the connecting duct 33 and the open vibration absorber valve 10 into the balancing chamber 8 out of which the second power chamber 5 will be refilled through the open first non-return valve 9. In the event of a movement of the piston 3 in downward direction in the so-called thrust stage the pressure existing in the second power chamber 5 which is positioned beneath the piston 3 will become higher than the pressure in the upper, first power chamber 4, so that the switching valve, respectively the second non-return valve 13 will be opened. The volumetric stream leaving the second power chamber 5 is divided, namely into a first part-stream which flows through the open second non-return valve 13 and the connecting duct 33 into the first power chamber 4 which is positioned above the piston 3 and a second part-stream which flows through the open vibration absorber valve 10 into the balancing chamber 8.

Two operating modes of the vibration absorber valve 10 are distinguished during operation of the inventive vibration absorber. In the first operating mode which corresponds to a lower range of piston speed in which low pressures and small volumetric flow rates occur the vibration absorber valve 10 works as a single-stage slide valve whose electromagnetic actuation determines the degree of opening of the pilot control stage 11.

In the second operating mode, which corresponds to an upper range of piston speed in which more elevated pressures and larger volumetric flow rates occur, the control slide valve 18 is being positioned, exactly as in the first operating mode, by an energization of the plunger coil 26. Its position is pre-established by an equilibrium between the force of the second compression spring 25, the positioning power of the plunger coil 26, the force which results from the pressure differential between the pressure existing within the main slide 16 and the balancing chamber pressure which acts upon the captivating element 28, and the hydrodynamic forces of flow which occur in the range of the mouth of the control bores 17. If and when the control bores 17 are closed, then the pressure existing within the main slide 16 will equal the system pressure, so that the main stage 12 will remain closed by the force of the first compression spring 21. When the control bores 17 are released a pressure differential will come about at the main slide 16 due to a flow of oil through the restricting bores 23 whose effect on the front face of the main slide 16 will let become effective a force which overcomes the spring force of the first compression spring 21, so that a movement of the main slide 16 in the downward direction will occur and the control edge 15, respectively the flow-off bores 19 will be released.

The movement of the main slide 16 which has just been mentioned has the result of a partial closure of the control bores 17, so that the volumetric flow rate passing through the restricting bores 23 will decrease and the pressure differential acting on the main slide 16 will be reduced. This control procedure will continue until the spring force of the first compression spring 21 overcomes the force resulting from the pressure differential and will close the main stage 12. Due to this mechanism, the position of the main stage 21 is hydraulically coupled to the position of the pilot control stage 11, the positioning energy being required for the movement of the main slide 16 being taken from the flow to be restricted.

In the upper operating range the vibration absorber valve 10 works as a two-stage pressure limiting valve, the electromagnetic actuation determining the level of the pressure differential at the main slide 16. By a suitable dimensioning of the components, the type of continuous transition between these operating ranges can be modelled, and nearly optional families of characteristic curves can be generated as characteristic of the vibration absorber valve. In particular, a smooth onset of the valve characteristics in the lower operating range will be possible, which corresponds to a comfort-oriented position of the vibration absorber when applied to controllable vehicle vibration absorbers. In the upper operating range the digressivity of the characteristic curves is essentially determined by the cross-sectional area of the captivating element 28 at its point of passage in the valve housing 14.

Figure 3:
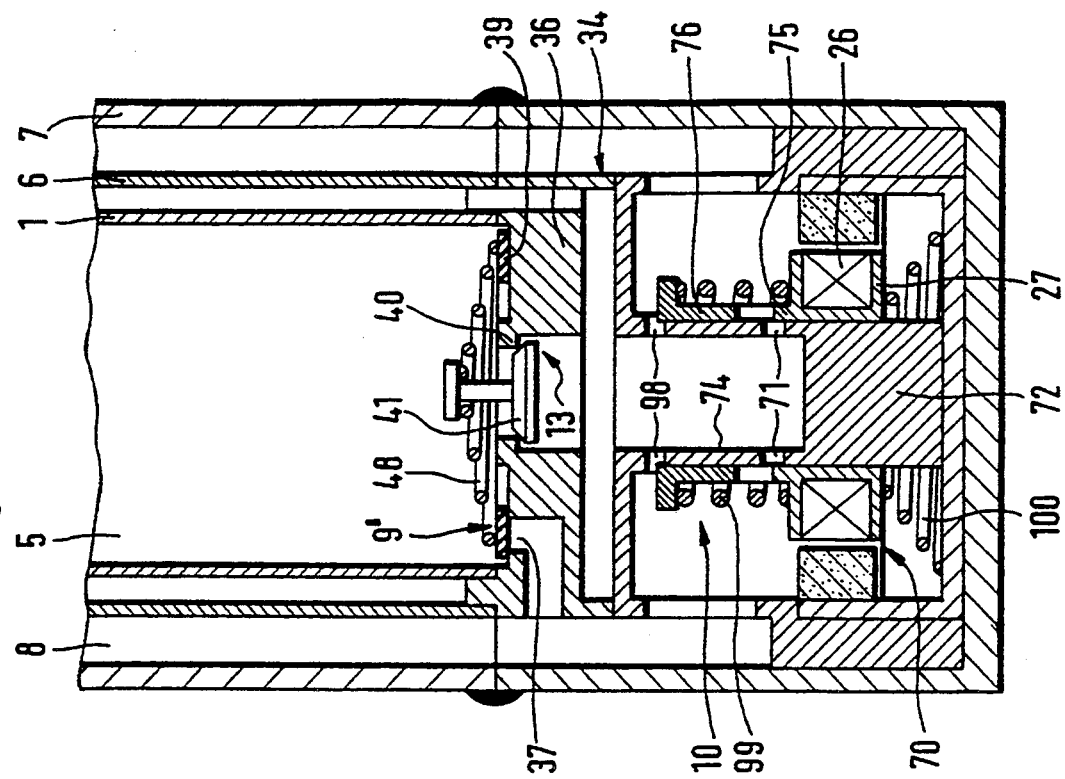
FIG. 3 shows a second embodiment of the valve assembly.

In the design variant illustrated in FIG. 3, the valve disc 39 of a first non-return valve 9' and the disc-shaped closing element 41 of the switching valve 13' are prestressed by one single spring 48 clamped in between them. The valve housing 34 is designed in two-parts which is similar to the embodiment shown in FIG. 2 and includes a valve body 36 and a vibration absorber valve part 72 whose central range is configured cylindrically and is furnished with a central bore 74 whose wall is provided with radial bores 71, 98 which afford a connection between the central bore 74 and the balancing chamber 8. Bores 71 are formed in the lower range of the central bore 74 and form cross-sectional areas of flow. Preferably a pressure-balanced first closing element, slide 75, interests with bores 71 and is coupled by means of a spring 99 to a pressure-unbalanced second slide 76 interacting with the bores 98 which are formed in the upper range of the central bore 74. In this context, the first slide 75 may preferably be formed by the coil support 27 of the plunger coil 26 mentioned in connection with FIG. 2. By the action of a second spring 100 taking support at the first slide 75 the cross-sectional areas of flow, respectively the bores 71, will be maintained partly closed in the de-energized condition of the transducer 70, so that a predetermined medium restricting function as well as a predetermined medium pressure limiting function are safeguarded in case of a failure of the electromechanic transducer 70.

In the third design version shown in FIG. 4, the valve assembly is accommodated in a valve housing 101 being preferably welded to the external tube 7. A first non-return valve 9'' which is disposed in the bottom range of the vibration absorber coaxially with the switching valve 13'' is formed by a disc-shaped closing element 47 which interacts with a sealing seat 46 formed in the valve body 42, while the switching valve, respectively the second non-return valve 13'', is designed in the shape of a valve disc 45 interacting with passages 43 which are formed in the valve body 42. Springs (spiral spring, respectively cup spring) 102, 103 which take support at the valve body 42, respectively at the valve housing 101, take care of the prestressing of the closing element 47, respectively of the valve disc 45.

The vibration absorber valve 10, which is in the shape of a seat valve in the illustrated design version, is positioned laterally of, preferably at right angle to, the axis of the non-return valves 9'', 13''. Its closing element 68, which is actuatable by the aforementioned electromechanic transducer 70 and is prestressed by means of a compression spring 104, interacting with a sealing seat 69 is formed at the valve housing 101.

In the fourth design version of the invention which is illustrated in FIG. 5 and whose arrangement of the vibration absorber valve 10 corresponds to that shown in FIG. 4, the switching valve, respectively the second non-return valve 13', includes a valve disc 50 which is prestressed by a spring 52, which is disposed radially outside the power cylinder 1 and which interacts with axially extending passages 51 formed in the valve housing 101. In its lower range (in the lower final stroke position of the piston 3) the power cylinder 1 is furnished with openings 53 which can be passed over completely or partially by the piston 3. The bores (openings) 53 end up in an annular chamber 54 which is defined by the valve housing 101 in radial direction (and axially from below) and by the second non-return valve 13' in axial direction.

Figure 6:
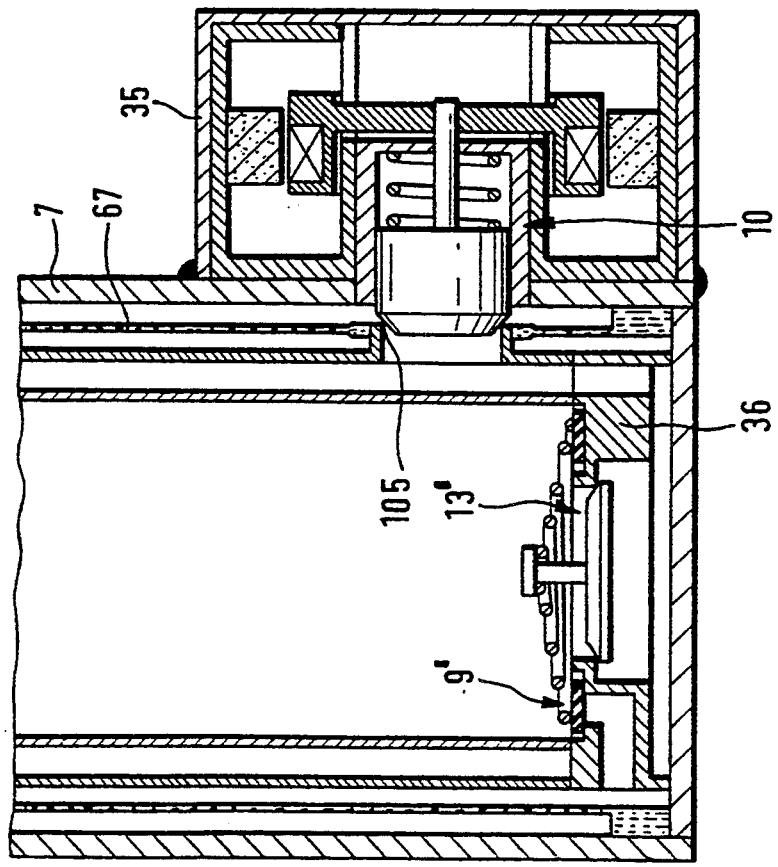
FIG. 6 shows a fifth embodiment of the valve assembly.

The fifth design version of the inventive vibration absorber, shown in FIG. 6 is provided with a two-part valve assembly which is positioned in the bottom range and whose first part is formed by the two non-return valves 9', 13' and valve body 36 disposed at the bottom of the power cylinder 1, while the vibration absorber valve 10 is positioned in a vibration absorber valve housing 35 fixed in the lower range of the external tube 7, at a generally right angle to the longitudinal axis of the vibration absorber. The sealing seat 105 of the vibration absorber valve 10 is designed as a seat valve at the tube 6, the first non-return valve 9' being preceded by a filter element 67.

Figure 7:
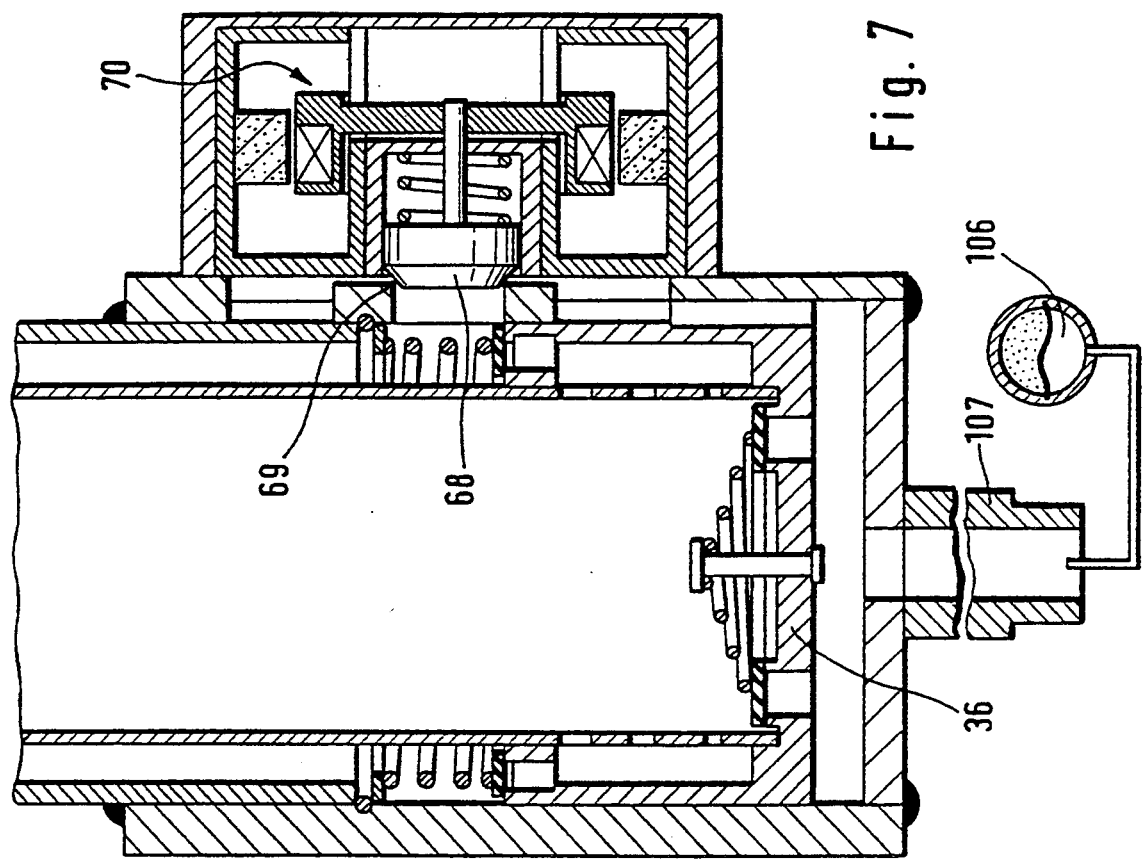
FIG. 7 shows a sixth embodiment of the valve assembly.

With regard to the set-up of the valve assembly, respectively the arrangement of the valves 9', 10 and 13', the design version which is shown in FIG. 7 corresponds largely to the variant illustrated in FIG. 5. The major difference consists, however, in that the balancing chamber 106 illustrated in FIG. 7 is arranged separately from the body of the vibration absorber and can be connected to the valve assembly by means of a hydraulic connection 107 which is provided in the bottom of the valve housing 101.

Figure 8:
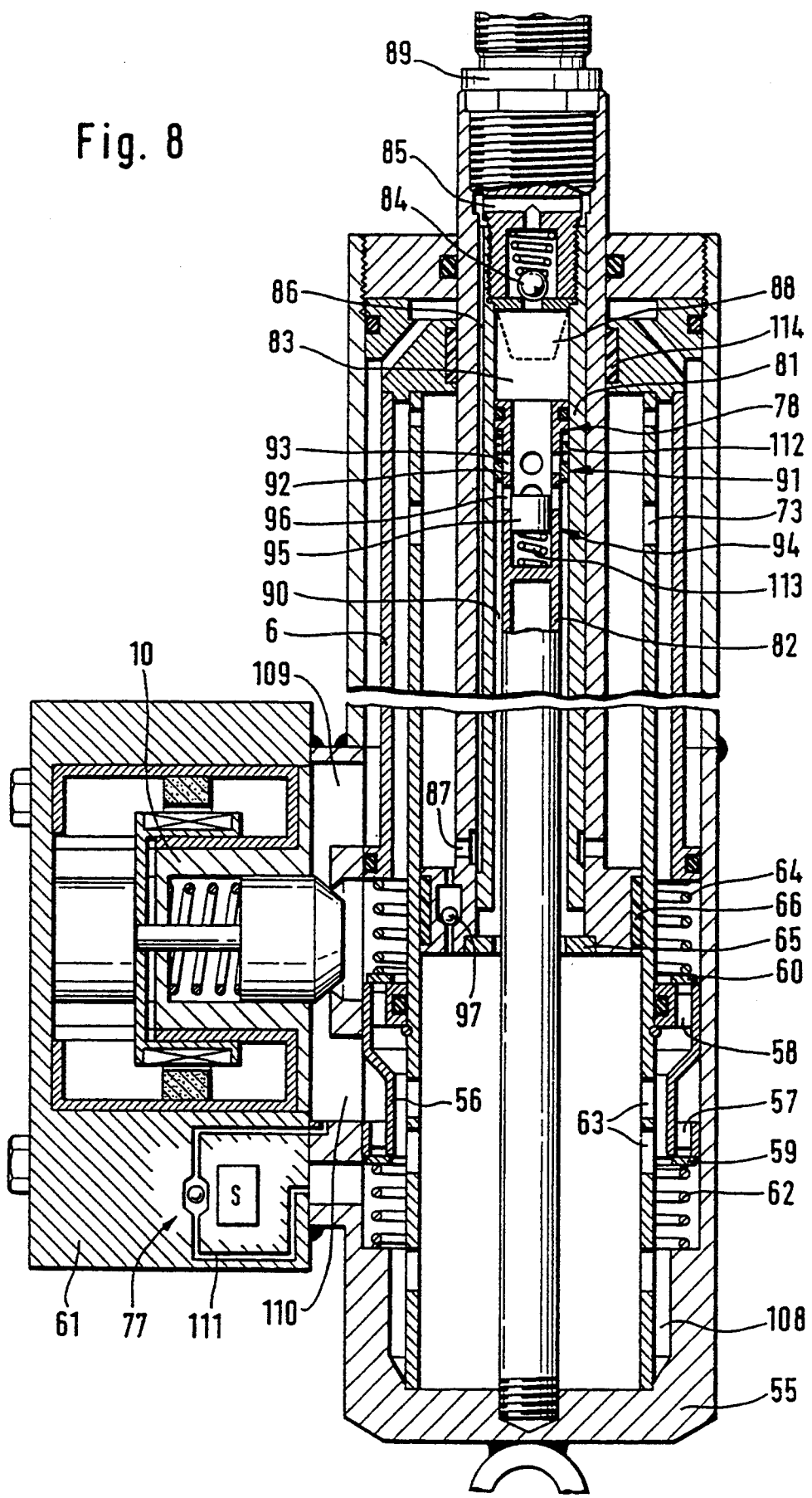
FIG. 8 shows a second design variant of the inventive vibration absorber.

In the embodiment illustrated in FIG. 8, the valve housing 55 is coupled, preferably welded, to the external tube 7 and accommodates only a valve body 56 whose axial passages 57, 58 jointly with the valve discs 59, 60 form equivalents of the first non-return valve 9 and the second non-return valve 13 of FIGS. 1 and 2 respectively. The valve discs 59, 60 are prestressed in the closing direction by means of one each spiral spring 62, 64 taking support at the valve housing 55, respectively at the lower end of the tube 6. The controllable vibration absorber valve 10 is disposed separately within a vibration absorber valve housing 61 which is flangeable to the valve housing 55.

The power cylinder 1 is provided with openings 63, 73 in both final piston stroke positions, the openings 63 are formed in the lower range of the power cylinder 1 ending up in an annular chamber 108 which accommodates the non-return valves 59, 60 and which is defined by the valve housing 55. The bores 73 are formed in the upper range of the power cylinder 1 and connect the interior space of the power cylinder 1 to the connecting duct 33. The vibration absorber valve housing 35 is provided with hydraulic pressure fluid ducts 109, 110 which, on one hand, establish a connection between the vibration absorber valve 10 and the balancing chamber 8 and, on the other hand, afford a volumetric stream out of the balancing chamber 8 to the first non-return valve 59. In addition, a third hydraulic pressure fluid duct 111 may be formed in the vibration absorber valve housing 61 which affords a connection between the second power chamber 5 and the balancing chamber 8 and in which a flow switch 77 can be inserted which senses the moving direction and/or the moving speed of the piston 3. Piston 3 is composed of a circular, closed plate 65 and of a mechanical seal 66.

Travel sensor 78, which has been mentioned in connection with FIG. 1, is composed of a pipe 81 which is disposed within the hollow piston rod 2 and within whose interior space a sensor core 82 is guided whose end is anchored in the bottom of the valve housing 55. Core 82 preferably defines within pipe 81 a chamber 83 in which air may accumulate, so that measures have to be provided which render possible its venting. For this purpose, chamber 83 is connected through a third non-return valve 84 to vent ducts 85, 86, 87, the first vent duct 85 being formed by a transverse bore in a threaded plug 89 which accommodates the third non-return valve 84 and which shuts the piston rod 2, the second vent duct 86 is formed by a groove being cut into the inside of the wall of the piston rod 2 and the third vent duct 87 is formed by a radial bore formed in the piston rod 2 and ending up in the first power chamber 4. Third non-return valve 84 can be and preferably is preceded by a filter 88.

Jointly with the pipe 81, core 82 is preferably tubular in shape in its upper range and defines an annular chamber 90 being in connection with the second power chamber 5. Annular chamber 90 is connectable through a fourth non-return valve 91 to the aforementioned chamber 83 above the sensor core 82. The fourth non-return valve 91 is formed by a valve slide 92 which is prestressed by means of a spring 112, which is slidingly guided on the core 82 and which interacts with radial passages, respectively openings 93, being formed in core 82. If need be, the venting means which have been described just now may be extended by a pressure limiting valve 94 which releases under certain conditions a connection between the chamber 83, respectively the interior space of the tubular sensor core 82, and the annular chamber 90, respectively the second power chamber 5. In the illustrated embodiment the pressure limiting valve 94 is composed of a valve piston 95 which is sealedly guided within the core 82 and is prestressed by means of a second spring 113, and of openings 96 which are formed in the tubular part of the sensor core 82 and which are released, respectively closed, depending on the hydraulic pressure acting on the valve piston 95.

For the undermentioned description of the mode of functioning, it is assumed that in the course of time air has accumulated in the chamber 83 before the third non-return valve 84. In the thrust stage, first the third non-return valve 84 will be opened and the air-oil mixture will be conveyed behind the third non-return valve 84 into the vent ducts 85, 86, 87 due to the pressure existing in the chamber 83. The active cross-sectional areas are dimensioned such that no distinct influence is brought to bear on the characteristic curve and there is no risk of soiling. If and when the pressure which acts in the chamber 83 becomes distinctly higher than that in the second power chamber 5, then the pressure limiting valve 94 will be opened. In the traction stage in which the third non-return valve 84 is closed and the chamber 83 is being filled through the fourth non-return valve 91 the air bubbles existing in the vent duct 86 will very slowly rise due to the ascending force until under the effect of the volume of hydraulic pressure agent having been conveyed behind the third non-return valve 84 they will be displaced into the first power chamber 4 in the subsequent thrust stage, out of which they will be urged by the piston rod guide 114.

Within the scope of this invention, a fifth non-return valve 97 can be provided in piston 3 which opens in the event of a pressure increase in the second power chamber 5 and will, thus, minimize the pressure drops occurring in the valve assembly. The travel-depending vibration absorption in the bottom range will, however, be lost.

The foregoing description is made for purposes of illustration only and is not intended to limit the scope of the invention which is only to be determined from the appended claims.

What is claimed is:

1. A controllable hydraulic vibration absorber for automotive vehicles with a power cylinder defining an interior space subdivided by means of a piston being slidable by a piston rod into a first and second power chamber, a connecting tube which is approximately positioned coaxially with said power cylinder and which jointly with the power cylinder defines a connecting duct, an external tube which is approximately positioned coaxially with said power cylinder and said connecting tube, and which jointly with said connecting tube defines a balancing chamber which is partly filled with oil and which is in connection with said first power chamber through said connecting duct and in connection with said second power chamber through a non-return valve, a switching valve which is subject to the pressure existing within said second power chamber and a controllable vibration absorber valve which affords variations of a vibration absorbing power, said non-return valve and said switching valve forming a valve assembly, said controllable vibration absorber valve being configured to include a slide valve to allow flow through said absorber valve in one direction only and operatively positioned in said valve assembly between said connecting duct and said balancing chamber, said switching valve being inserted between said second power chamber and said connecting duct, wherein said connecting tube is axially, slidingly, and rotatably positioned with respect to said power cylinder.

2. A vibration absorber as claimed in claim 1, wherein said non-return valve includes a valve disc and said switching valve includes a valve body both of which are prestressed by means of a spring inserted between them.

3. A controllable hydraulic vibration absorber for automotive vehicles with a power cylinder defining an interior space subdivided by means of a piston being slidable by a piston rod into a first and second power chamber, a connecting tube which is approximately positioned coaxially with said power cylinder and which jointly with the power cylinder defines a connecting duct, an external tube which is approximately positioned coaxially with said power cylinder and said connecting tube, and which jointly with said connecting tube defines a balancing chamber which is partly filled with oil and which is in connection with said first power chamber through said connecting duct and in connection with said second power chamber through a non-return valve, a switching valve which is subject to the pressure existing within said second power chamber and a controllable vibration absorber valve which affords variations of a vibration absorbing power, said non-return valve and said switching valve forming a valve assembly, said controllable vibration absorber valve being configured to include a slide valve to allow flow through said absorber valve in one direction only and operatively positioned in said valve assembly between said connecting duct and said balancing chamber, said switching valve being inserted between said second power chamber and said connecting duct, wherein a travel sensor is disposed between the piston and the external tube for monitoring piston stroke.

4. A vibration absorber as claimed in claim 3, wherein said travel sensor includes a pipe which projects into, is sealedly guided within, and projects out of the said piston rod; and a core movably positioned within the said pipe.

5. A vibration absorber as claimed in claim 4, wherein said pipe is fixed adjacent to said valve assembly, and said core is fixed to said piston rod.

6. A controllable hydraulic vibration absorber for automotive vehicles with a power cylinder defining an interior space subdivided by means of a piston being slidable by a piston rod into a first and a second power chamber, a connecting tube which is approximately positioned coaxially with said power cylinder and which jointly with the power cylinder defines a connecting duct, an external tube which is approximately positioned coaxially with said power cylinder and said connecting tube, and which jointly with said connecting tube defines a balancing chamber which is partly filled with oil and which is in connection with said first power chamber through said connecting duct and in connection with said second power chamber through a non-return valve, a switching valve which is subject to the pressure existing within said second power chamber and a controllable vibration absorber valve which affords variations of a vibration absorbing power, said non-return valve and said switching valve forming a valve assembly, said controllable vibration absorber valve being configured to include a slide valve to allow flow through said absorber valve in one direction only and operatively positioned in said valve assembly between said connecting duct and said balancing chamber, said switching valve being inserted between said second power chamber and said connecting duct, wherein said non-return valve, said switching valve, and said controllable vibration absorbing valve are all aggregated into a valve housing at an end of the power cylinder.

7. A vibration absorber as claimed in claim 6, wherein the slide valve is integral with said valve housing has a first valve body and a guide element, a main stage formed by a main slide slidably supported in and interacting with a control edge of said guide element and a pilot control stage formed by a control slide slidably supported in and interacting with control bores of said main slide and fixed to an electromechanical transducer for movement therewith.

8. A vibration absorber as claimed in claim 7, wherein said control edge is formed adjacent flow-off bores which are formed in said guide element and are in connection with said balancing chamber.

9. A vibration absorber as claimed in claim 8, wherein said main slide is open at its upper end and is furnished with bores which allow fluid communication with said flow-off bores.

10. A vibration absorber as claimed in claim 7 wherein said main slide is prestressed by means of a first compression spring in the closing direction of the said main stage and is abutted against the said first valve body in the condition of rest.

11. A vibration absorber as claimed in claim 10, wherein the abutment of the said main slide against said first valve body takes place by means of axial projections.

12. A vibration absorber as claimed in claim 7, wherein said main slide is provided with restricting bores which communicate on one side with said bores and, on the other side, with a hydraulic chamber which is defined by the said main slide in the said guide element.

13. A vibration absorber as claimed in claim 7, wherein said control slide is guided in said main slide and is in abutment against said main slide in the condition of rest under the prestressing action of a second compression spring.

14. A vibration absorber as claimed in claim 7, wherein said control slide is connected to the plunger coil support by a connecting element having a head portion which abuts said main slide in the condition of rest.

15. A vibration absorber as claimed in claim 14, wherein said electromechanic transducer includes said plunger coil and said permanent magnet mounted within a hydraulic chamber, said hydraulic chamber being in connection with said balancing chamber, so that the end of said connecting element which is fixed to said plunger coil support is subjected to the effect of the pressure existing in said balancing chamber.

\* \* \* \* \*